(12) United States Patent
Bachmann et al.

(10) Patent No.: US 9,855,805 B2
(45) Date of Patent: Jan. 2, 2018

(54) BUOYANCY MODULE FOR A MILITARY VEHICLE

(71) Applicant: KRAUSS-MAFFEI WEGMANN GMBH & CO. KG, Munich (DE)

(72) Inventors: Harald Bachmann, Munich (DE); Rudiger Baus, Munich (DE)

(73) Assignee: KRAUSS-MAFFEI WEGMANN GMBH & CO. KG, Munich (DE)

( * ) Notice: Subject to any disclaimer, the term of this patent is extended or adjusted under 35 U.S.C. 154(b) by 1 day.

(21) Appl. No.: 14/914,724

(22) PCT Filed: Aug. 7, 2014

(86) PCT No.: PCT/DE2014/100287
§ 371 (c)(1),
(2) Date: Feb. 26, 2016

(87) PCT Pub. No.: WO2015/027989
PCT Pub. Date: Mar. 5, 2015

(65) Prior Publication Data
US 2016/0200159 A1   Jul. 14, 2016

(30) Foreign Application Priority Data
Aug. 30, 2013  (DE) .................. 10 2013 109 500

(51) Int. Cl.
*B60F 3/00* (2006.01)
*F41H 7/02* (2006.01)

(52) U.S. Cl.
CPC .............. *B60F 3/00* (2013.01); *B60F 3/0007* (2013.01); *B60F 3/0015* (2013.01); *B60F 3/0038* (2013.01); *F41H 7/02* (2013.01)

(58) Field of Classification Search
CPC ........ B60F 3/0038; B63B 43/14; B63B 43/10
See application file for complete search history.

(56) References Cited

U.S. PATENT DOCUMENTS

| 3,229,781 A | 1/1966 | Jones |
| 3,741,146 A * | 6/1973 | Durrell, Jr. ............... B60F 3/00 440/12.53 |
| 6,626,712 B1 | 9/2003 | Bellezza Quater et al. |

(Continued)

FOREIGN PATENT DOCUMENTS

| DE | 69807395 T2 | 3/2003 |
| EP | 0872366 A1 | 10/1998 |

(Continued)

OTHER PUBLICATIONS

PCT, International Search Report, International Application No. PCT/DE2014/100287, dated Dec. 23, 2014.

(Continued)

*Primary Examiner* — Andrew Polay
(74) *Attorney, Agent, or Firm* — Thompson Hine LLP

(57) ABSTRACT

A buoyancy module (10) may include a buoyancy body (11) for a vehicle, in particular, a military vehicle (1) such as a watercraft, and a land driving unit (13) for operating the vehicle (1) as a land vehicle. A vehicle (1) may include a base module (20), for accommodating crew members, and a buoyancy module (10) which can be arranged on the base module for operating the vehicle (1) as a watercraft.

18 Claims, 9 Drawing Sheets

(56) References Cited

U.S. PATENT DOCUMENTS

| | | | | |
|---|---|---|---|---|
| 8,454,399 B1 * | 6/2013 | Zelechonok | ........... | B60F 3/0038 440/12.51 |
| 2009/0242697 A1 * | 10/2009 | Schmidt | .................... | F41H 7/02 244/106 |
| 2012/0184159 A1 * | 7/2012 | Fuglsang | .............. | B60F 3/0038 440/12.63 |

FOREIGN PATENT DOCUMENTS

| | | |
|---|---|---|
| EP | 1547829 A2 | 6/2005 |
| FR | 1329023 A | 6/1963 |
| WO | 02/12045 A1 | 2/2002 |
| WO | 2010/085169 A1 | 7/2010 |
| WO | 2010/097653 A1 | 9/2010 |

OTHER PUBLICATIONS

PCT/DE2014/100287, International Preliminary Report on Patentability (English translation), dated Mar. 10, 2016.

\* cited by examiner

BUOYANCY MODULE FOR A MILITARY VEHICLE

CROSS-REFERENCE TO RELATED APPLICATIONS

This application is a National Stage filing of International Application No. PCT/DE2014/100287, filed Aug. 7, 2014, which claims priority of German Application No. 10 2013 109 500.3 filed Aug. 30, 2013, which are incorporated herein by reference in their entireties.

TECHNICAL FIELD

The invention relates to a flotation module which has a buoyancy body for an in particular military vehicle and, for operation of the vehicle as a watercraft, can be fastened thereon. The invention also relates to an in particular military vehicle having a main module in particular for accommodating crew members.

BACKGROUND

Military vehicles, for example combat tanks, armored personnel carriers, armored bridge layers or armored transport vehicles, are often of modular construction whereby the vehicle can be rendered usable in the mission-specific manner for certain use purposes by the optional fitting of appropriate modules.

The vehicles here usually have a main module, which, for the construction of different vehicle variants, can be combined with different additional modules.

In the case of amphibious vehicles, which are used for both land and water travel, provision is often made for said vehicles to be equipped with an additional flotation module for water travel. The flotation module has a usually large-volume buoyancy body which, during water travel, ensures the necessary degree of buoyancy and is intended to prevent the vehicle from becoming immersed too deeply.

It has been found to be problematic here that the buoyancy bodies have an in some cases quite considerable volume. Even in comparison with other additional modules which can be arranged on the vehicle, this can result in a significant increase in the vehicle dimensions, on account of which it is sometimes not possible to maintain transport or loading dimensions.

SUMMARY

Taken against this background, it is an object of the invention to specify a vehicle which, even in the case of a comparatively large-volume flotation module being fitted, is distinguished by compact dimensions.

In respect of a flotation module of the type mentioned in the introduction, it is proposed, in order to achieve the object, that a land travel subassembly for operation of the vehicle as a land vehicle should be provided on the flotation module.

By virtue of a land travel subassembly, which serves for land-travel purposes, being arranged on the flotation module, there is no need to keep an amount of installation space for the corresponding land travel subassembly in the main module. The corresponding land travel subassembly may be fitted in a suitable position on the large-volume flotation module. The main module may be of more compact design overall, and this results in the dimensions of the vehicle made up of the main module and the flotation module being reduced overall.

According to an advantageous configuration of the invention, the land travel subassembly is arranged within the buoyancy body. By virtue of the land travel subassembly being arranged in the interior of the buoyancy body, the land travel subassembly can be protected against the action of water. Also achieved is a compact construction, in which the land travel subassembly is not visible from the outside.

The flotation module preferably has an interface, via which the land travel subassembly can interact with other vehicle components. Via the interface, it is possible to establish a connection between the land travel subassembly and other vehicle components, in particular such vehicle components as are arranged in the main module. It is particularly preferred for the interface to be designed in the form of a plug-in connection, and therefore the connection between the land travel subassembly and the other vehicle component can be established by a plug-in operation and released by an unplugging operation.

It is also advantageous if the flotation module has a prow-like outer contour. Such an outer contour of the flotation module makes it possible to improve the flow behavior of the entire vehicle in the water. The flotation module can provide a vehicle which is optimized for land travel with an outer contour which is similar to that of a watercraft. This then gives rise to flow properties which are advantageous for water travel.

The flotation module may consist of a lightweight material, in particular of aluminum, magnesium, titanium or a fiber composite material. As a result of a lightweight material being used for the flotation module, the weight of the flotation module makes up an extremely small fraction of the overall weight of the vehicle and thus also lowers the overall weight of the vehicle.

A preferred configuration makes provision for the land travel subassembly to be designed in the form of an electric, hydraulic or pneumatic load or in the form of an electric, hydraulic or pneumatic power source. The land travel subassembly may be designed, for example, in the form of a cooling system, ABC system, tank, battery system, power-supply unit, hydraulic pump or compressor.

In the case of a vehicle of the type mentioned in the introduction, the object is achieved by a flotation module which, for operation of the vehicle as a watercraft, can be arranged thereon and has one or more of the abovedescribed features.

This gives rise to the advantages already described in conjunction with the flotation module.

An advantageous configuration makes provision for the flotation module to be designed such that it encompasses the main module at the prow and/or laterally, and therefore the flotation module forms the outer contour of the vehicle in those regions of the vehicle on the prow and/or on the sides which are crucial for flow behavior. This means that the flow behavior of the vehicle during water travel can be determined decisively by the flotation module.

It is also advantageous if the flotation module can be arranged above the main module, and therefore the roof contour of the vehicle is determined by the flotation module. A particular amount of importance is attributed to the roof contour since, during water travel of the vehicle, the roof contour projects out of the water and is thus visible. The flotation module can predetermine a suitable roof contour which is for example particularly unobtrusive, so that detection of the vehicle during military use is difficult. In addition, the flotation module can predetermine the distance between the roof contour of the vehicle and the water line.

It is optionally possible for the flotation module to be arranged on the main module such that the flotation module seals air-entry and/or air-exit openings of the main module. This is accompanied by the advantage that the air-entry and/or air-exit openings are protected, during water travel, against the ingress of water.

The flotation module preferably has an aperture, which is arranged such that a hatch of the main module, during operation of the vehicle as a watercraft, can be opened. As a result of the aperture, hatches which are present on the main module can be used even when the flotation module is connected to the main module. The aperture is particularly preferably arranged in the region of the rear of the vehicle or in the roof region of the vehicle.

According to an advantageous configuration, the vehicle has a mission module for operation of the vehicle as a land vehicle, it being possible for the mission module to be connected optionally to the main module instead of the flotation module. The flotation module can be changed over for the mission module as soon as the vehicle has left the water.

A preferred configuration makes provision for a water drive, for driving the vehicle during water travel, to be arranged on the flotation module. The water drive may be designed, for example, in the form of a water-jet drive or of a propeller drive.

It is particularly preferred for the main module to have an interface, via which the water drive is supplied with power. The interface may be designed in the form of a plug-in connection. The water drive is preferably connected to the main drive of the vehicle via the interface.

The main module preferably has a detection device, which can detect the module connected to the main module. The detection device makes it possible, for example, to determine that a flotation module is connected to the main module, and appropriate adjustments can be carried out automatically. For example, the air intake by way of the main module can be adjusted such that, in the case of the flotation module being connected, air is taken in exclusively via those air-inlet openings which are located above the water line.

Further advantages and details of the invention will be explained hereinbelow with reference to an exemplary embodiment illustrated in the accompanying drawings, in which:

DETAILED DESCRIPTION

FIGS. 1 to 5 illustrate an amphibious vehicle 1 designed in the form of a military combat vehicle. As will be explained hereinbelow, the vehicle 1 is of modular construction and can be used both as a land vehicle and as a watercraft.

Figure 1:
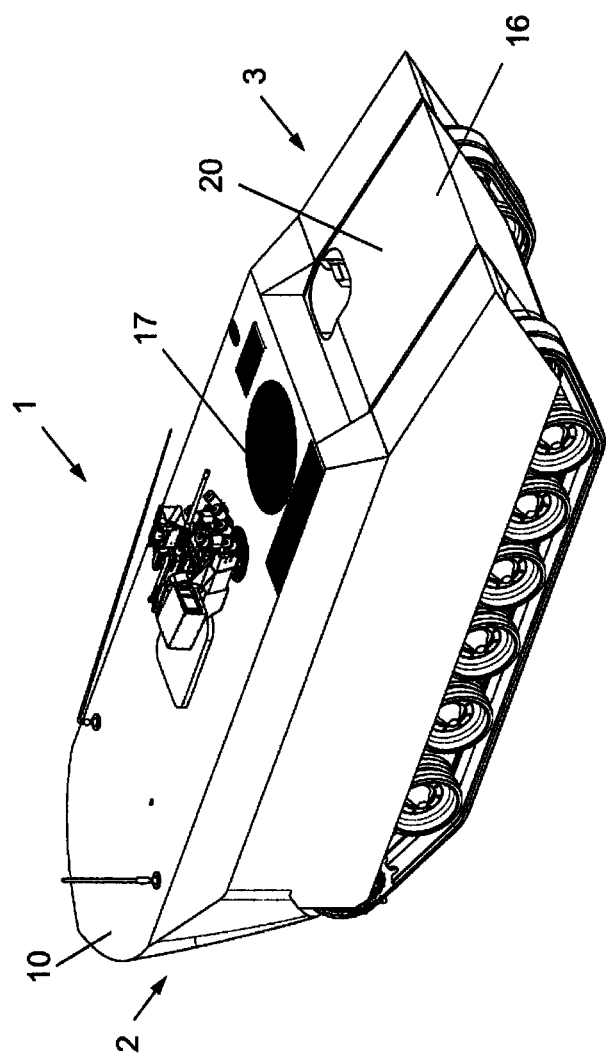
FIG. 1 shows a perspective view of a military vehicle according to the invention.
Figure 2:
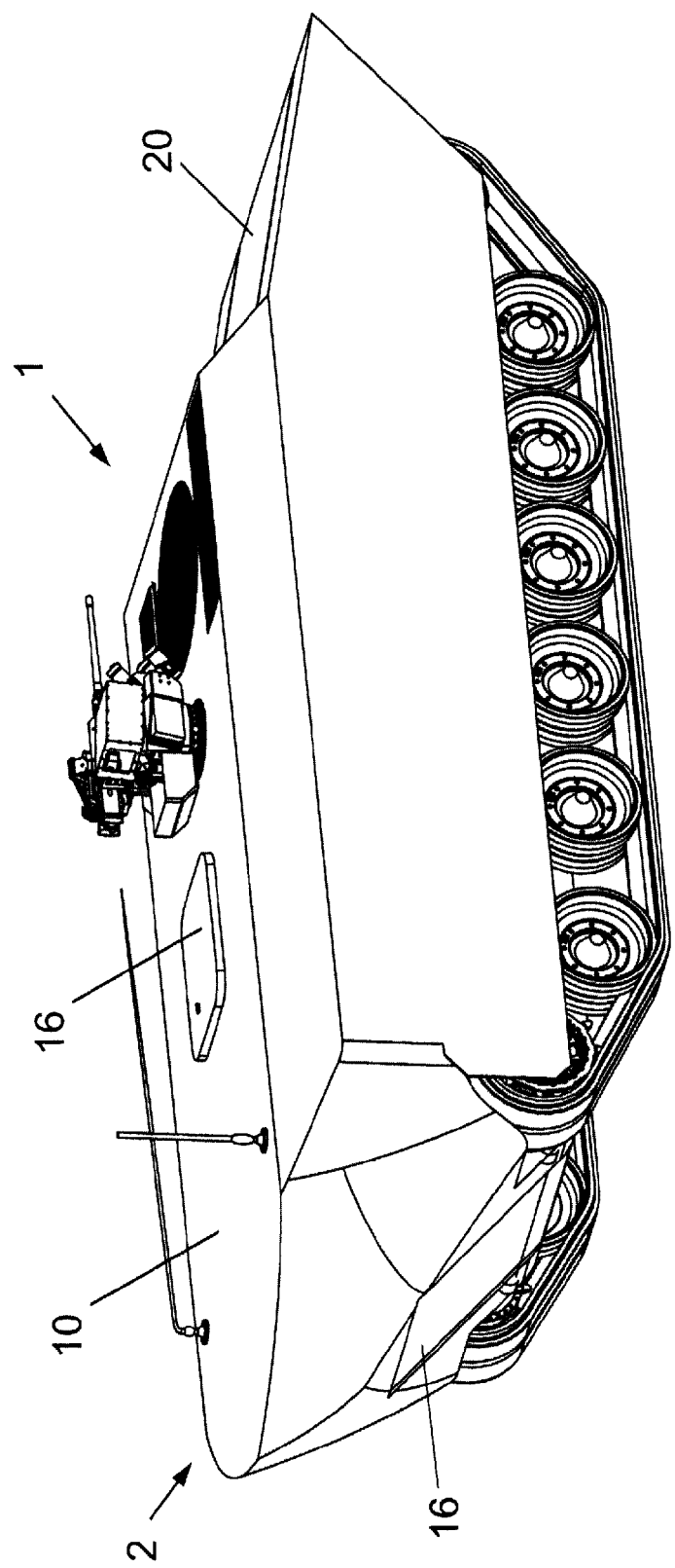
FIG. 2 shows another perspective view of the vehicle.
Figure 3:
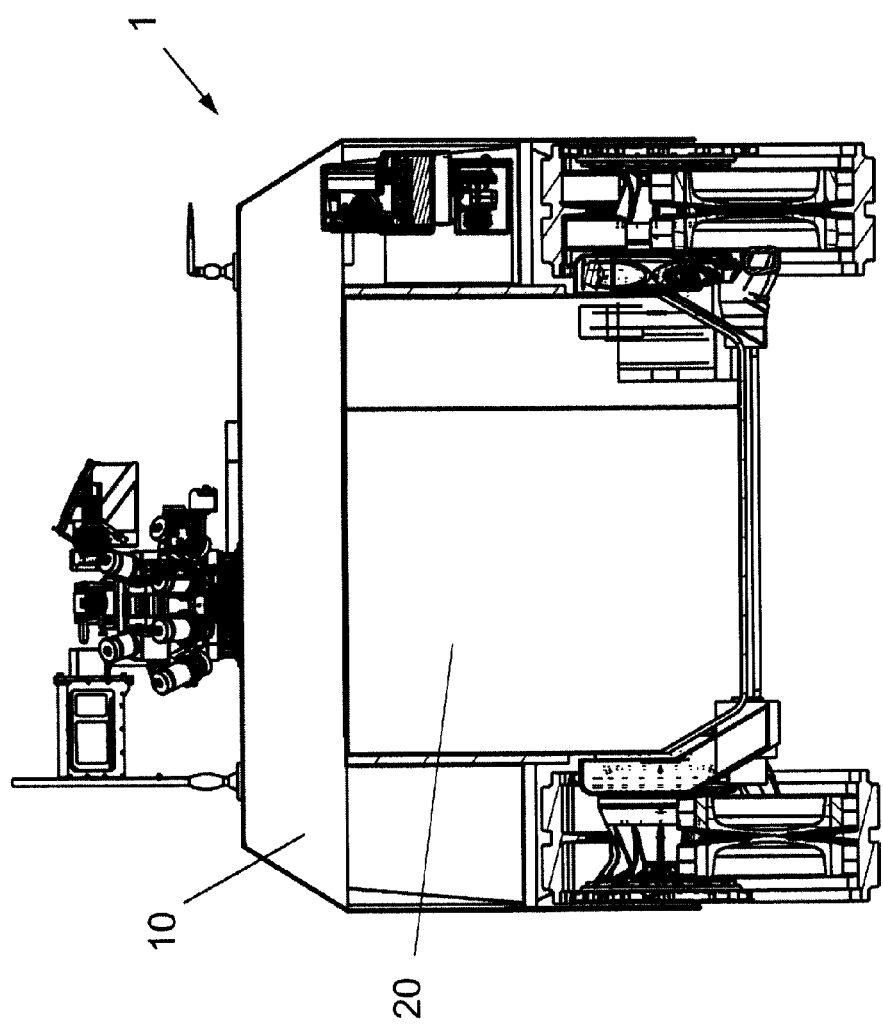
FIG. 3 shows a sectional illustration of the vehicle according to FIG. 1 taken along a vertical transverse plane of the vehicle.
Figure 4:
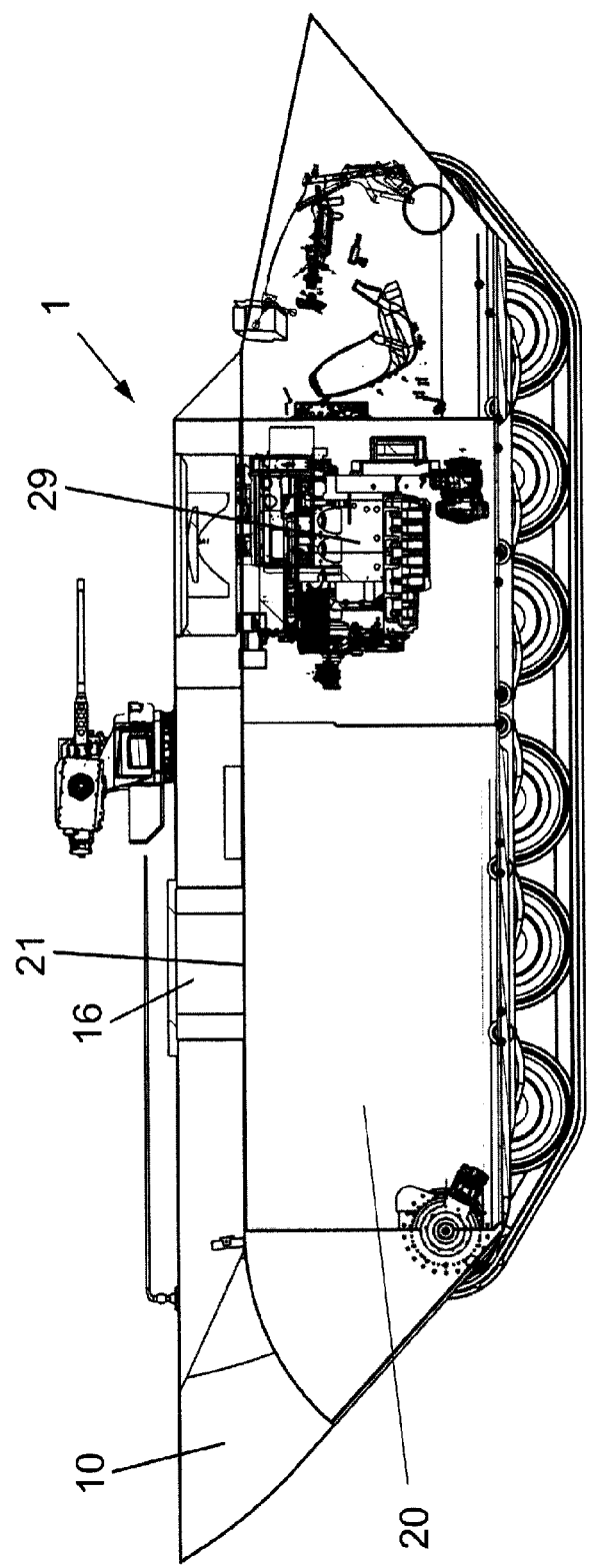
FIG. 4 shows a sectional illustration of the vehicle according to FIG. 1 taken along a vertical longitudinal plane of the vehicle.
Figure 5:
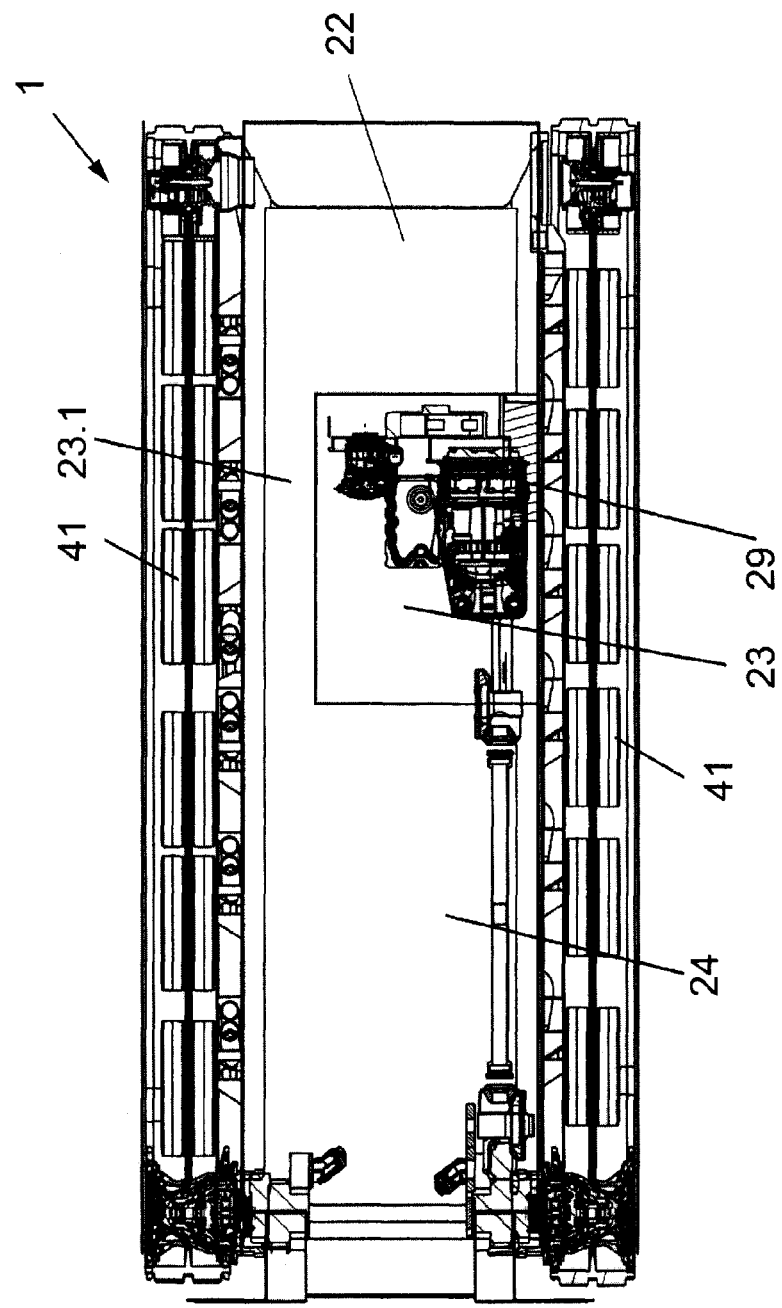
FIG. 5 shows a sectional illustration of the vehicle according to FIG. 1 taken along a horizontal section plane.
Figure 6:
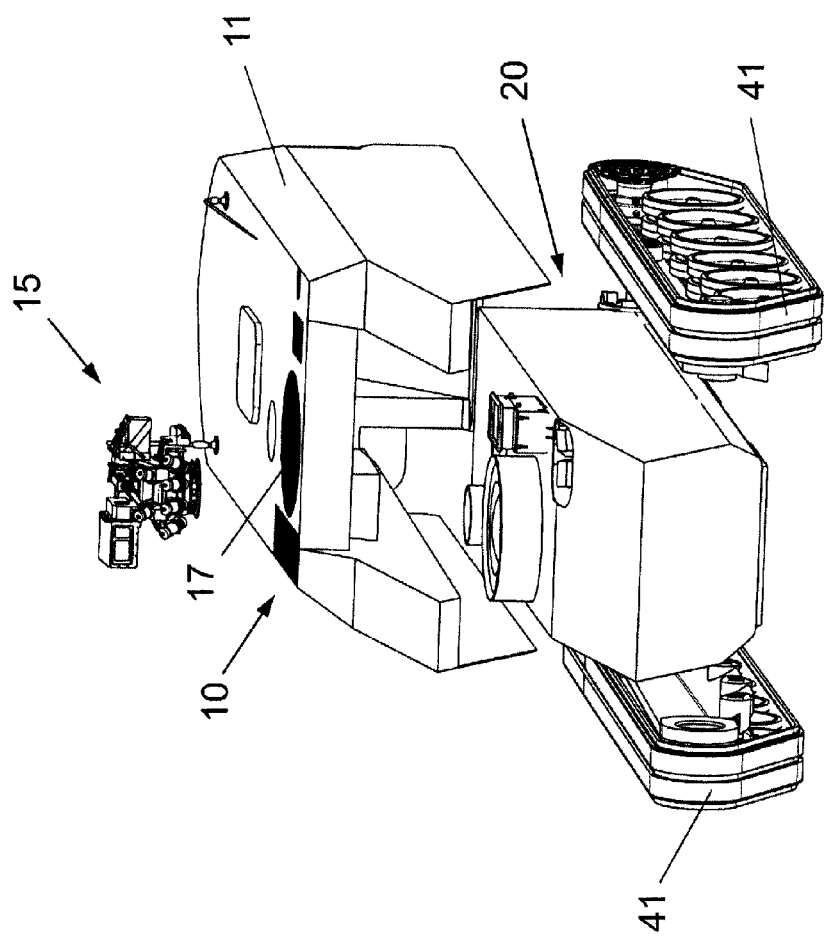
FIG. 6 shows a perspective exploded illustration of the vehicle according to FIG. 1.
Figure 7:
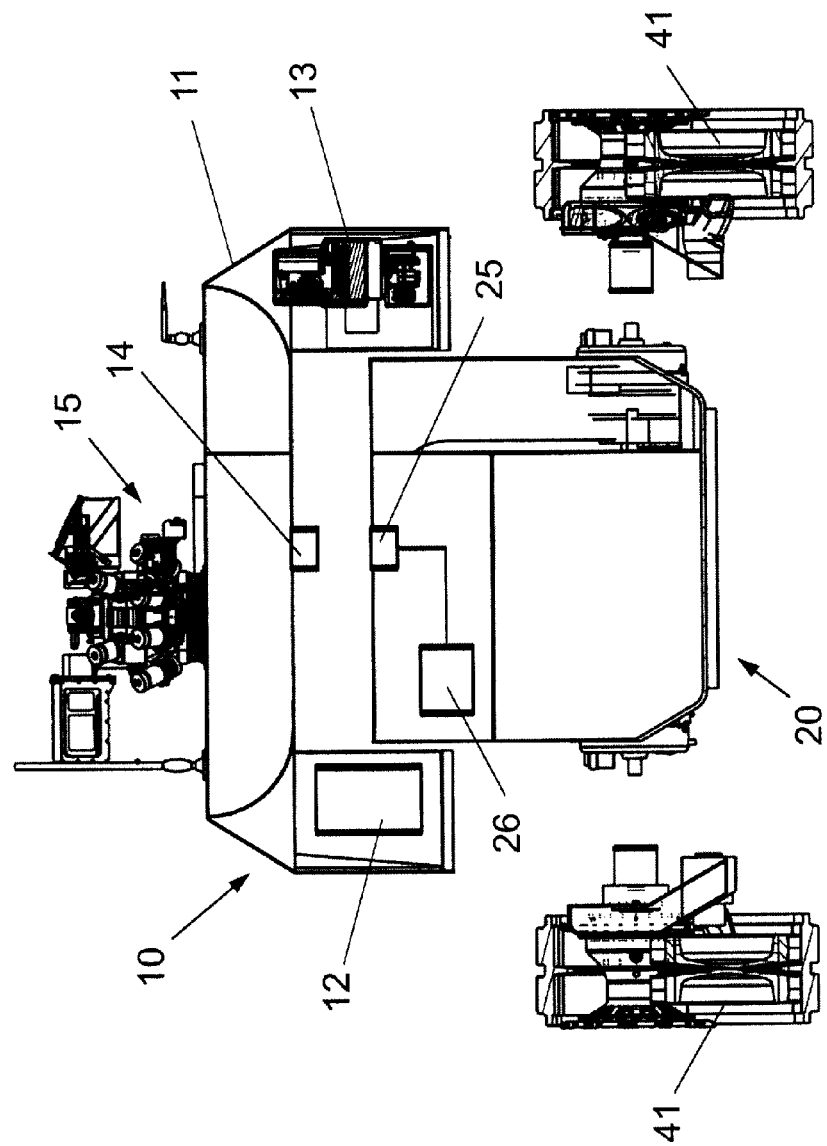
FIG. 7 shows a sectional exploded illustration of the vehicle according to FIG. 7.

The illustrations in FIGS. 6 and 7 show the modular construction of the vehicle 1. In order to accommodate the crew, a driver, a commander, a gunner and other crew members, the vehicle 1 has a region which is protected against military threat. The protected region of the vehicle 1 is formed by a main module 20. As can be gathered from the illustration in FIG. 5, the interior of the main module 20 is divided up into an operating region 22, from which the driver controls the vehicle 1, an engine region 23, in which is arranged the engine 29 for travel on land, and a crew region 24, in which the rest of the crew members are accommodated. The engine region 23 is arranged between the operating region 22 and the crew region 24. The engine region 23 contains an emergency access passage 23.1, via which crew members can pass from the operating region 22 into the crew region 24, and vice versa.

The main module 20 has two crawler tracks 41. The crawler tracks 41 are driven by an engine 29 arranged in the interior of the main module 20.

A flotation module 10 is provided in the region above the main module 20. In contrast to the main module 20, which consists of armored steel, the flotation module 10 is produced from a lightweight material. Examples of suitable lightweight materials are aluminum, magnesium, titanium, alloys of these or fiber composite materials.

The essential element of the flotation module 10 is a buoyancy body 11, which renders the vehicle 1 buoyant. In order to improve the flow properties, the flotation module 10 has a prow-like outer contour. In the prow region 2, the flotation module 10, in contrast to the rear 3 of the flotation module 10, is of rounded design.

Also provided on the flotation module 10 is a water drive 12, which can drive the vehicle 1 in the water. The water drive 12 is preferably designed in the form of a water-jet drive.

It can be gathered from FIG. 6 that the flotation module 10 has a U-shaped cross section and encompasses the main module 20 at the prow and laterally. On its upper side, the flotation module 10 has an aperture 16, which is arranged such that a hatch 21 of the main module 20, during operation of the vehicle 1 as a watercraft, can be opened, cf. FIG. 4.

Also provided on the upper side of the flotation module 10 is a mount 15, in which is accommodated a remote-control weapon, which can be operated from the interior of the vehicle 1, in particular from the protected region.

In order to maintain dimensions which are as compact as possible for the vehicle 1, a land travel subassembly 13 for operation of the vehicle 1 as a land vehicle is provided on the flotation module 10. The land travel subassembly 13 serves for travel on land, i.e. it is operated during travel on land. It is also possible for the land travel subassembly 13 to be switched on during water travel. Since the land travel subassembly 13 is arranged on the flotation module 20, there is no need to keep an amount of installation space for the land travel subassembly 13 in the main module 20, and this allows the main module to be of compact configuration overall.

As can be gathered from the illustration in FIG. 7, the land travel subassembly 13 is arranged within the buoyancy body 11 of the flotation module 10. Arrangement within the gas-tight and water-tight buoyancy body 11 protects the land travel subassembly 13 against the action of water and/or gaseous pollutants. The positioning of the land travel subassembly 13 on or in the flotation module 10 also makes it possible to adjust the trim of the vehicle 1 during water travel. To this extent, the selection of the position of the land travel subassembly 13 makes it possible to influence the floating position and thus the maneuverability of the vehicle 1 in the water.

In the case of the exemplary embodiment, the land travel subassembly 13 is designed in the form of a cooling system, via which it is possible to cool the interior of the main module 20 during travel on land. As an alternative, or in addition, it is possible for other land travel subassemblies 13, e.g. an ABC system, a battery system, a tank, a power-supply unit, a hydraulic pump or a compressor, to be arranged in the flotation module.

Arranging the land travel subassembly 13 on the unprotected flotation module 10 means that the land travel subassembly 13 is exposed to military threat very much without protection. The land travel subassemblies 13 arranged in the flotation module are therefore preferably those which, if they fail, in emergency situations, do not compromise a possibly life-saving residual mobility of the vehicle 1.

It is possible for the flotation module 10, for water travel, to be connected in a releasable manner to the main module 20. In order to allow attachment of the land travel subassembly 13, which is arranged on the flotation module 10, the flotation module 10 has an interface 14, which is designed in the form of a plug-in connection and can be connected to a corresponding interface 25 of the main module 20. Via the interfaces 14 and 25, the land travel subassembly 13 can interact with other vehicle components. Furthermore, it is possible for the water drive 12 of the flotation module 10 to be supplied with power via the interfaces 14, 25.

Also provided in the main module 20 is a detection device 26, which is connected to the interface 25 and can detect the module 10 connected to the main module 20. This is important in so far as it is possible for other modules 30, instead of the flotation module 10, to be connected to the main module 20. The operating behavior of devices belonging to the main module 20 is adjusted in dependence on the module 10, 30 which is attached in each case. For example, upon detection of a flotation module 10, the air intake by way of the main module 20 is adjusted such that the air is taken in exclusively via such air-inlet openings 17 as are located above the water line. In addition, it is possible for the interface 25 to be configured in dependence on the module connected.

Figure 8:
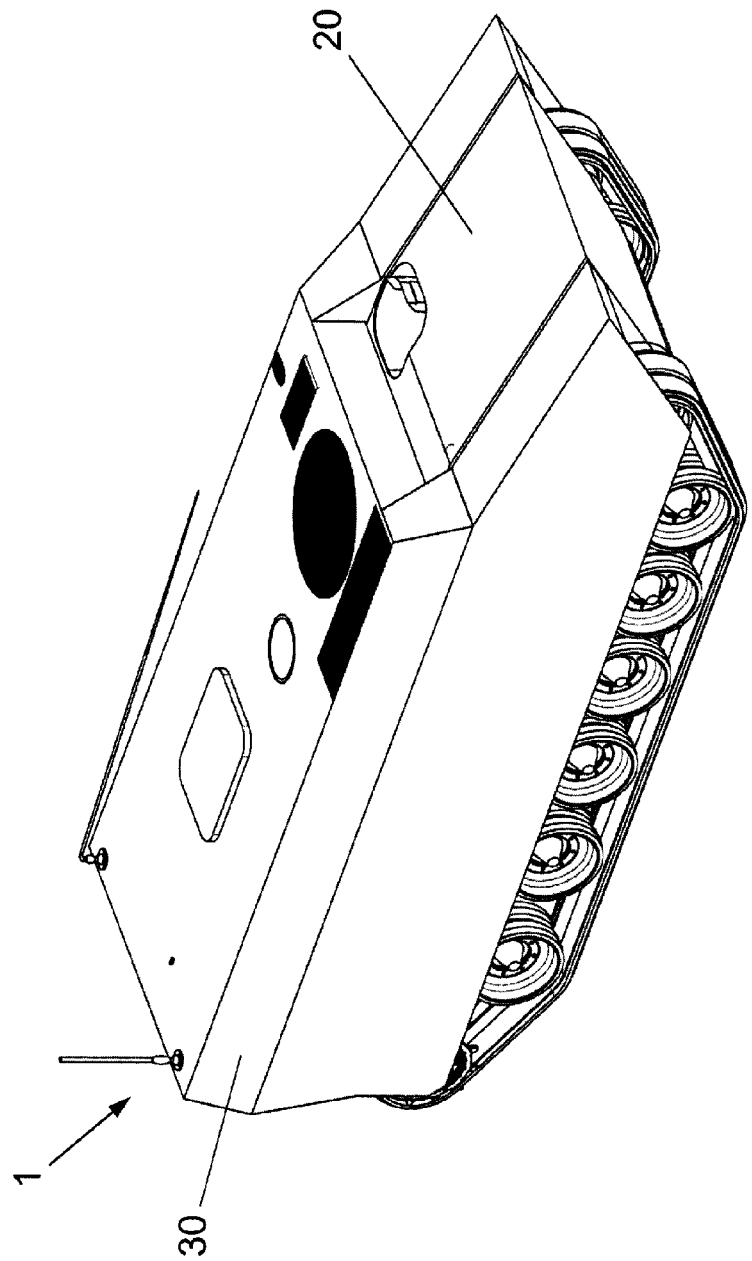
FIG. 8 shows a perspective view of a second military vehicle.
Figure 9:
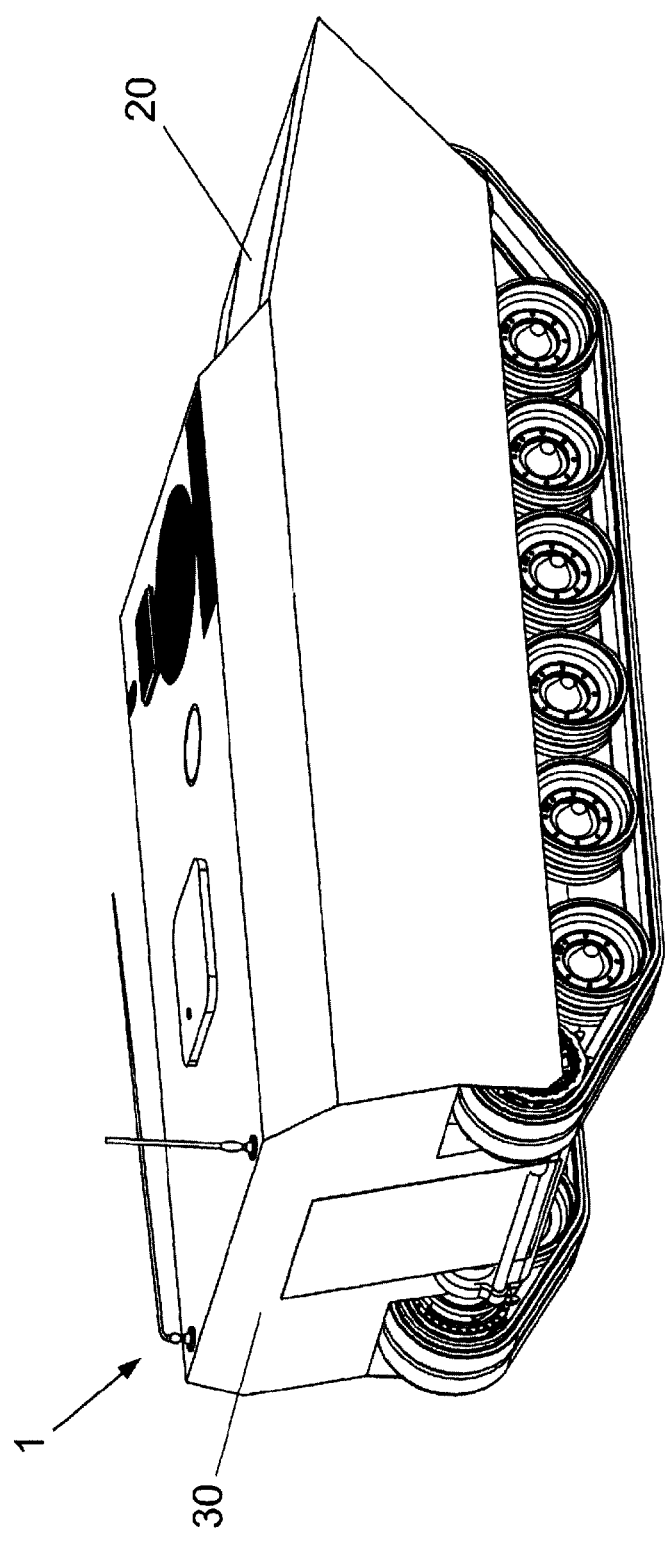
FIG. 9 shows another perspective view of the vehicle according to FIG. 8.

The illustration in FIGS. 8 and 9 show a vehicle 1 in which, instead of the flotation module 10, a mission module 30 is connected to the main module 20. The mission module 30 is designed in the form of a land travel module and does not have a large-volume buoyancy body, i.e. the vehicle 1 according to FIGS. 8 and 9 can be operated only on land and is not buoyant.

Like the flotation module 20 described above, it is also the case that the mission module 30 has a land travel subassembly 13 (not illustrated specifically), as a result of which the same functionalities can be achieved during travel on land as are also obtained in the case of a flotation module 10 of the type described above. The corresponding land travel subassembly 13 may be arranged in the mission module 30 such that the overall vehicle is optimized in respect of loading dimensions or overall weight.

DESIGNATIONS

1 Vehicle
2 Prow
3 Rear
10 Flotation module
11 Buoyancy body
12 Water drive
13 Land travel subassembly
14 Interface
15 Mount
16 Aperture
17 Air inlet
20 Main module
21 Hatch
22 Operating region
23 Engine region
23.1 Emergency access passage
24 Crew region
25 Interface
26 Detection device
29 Engine
30 Mission module
41 Crawler track

The invention claimed is:

1. A flotation module for a vehicle, the vehicle having a main module to accommodate a crew and an engine that drives crawler tracks of the vehicle, the flotation module comprising:
    a buoyancy body that renders the vehicle buoyant, the buoyancy body having an inverted U shape in cross section that extends over lateral sides and a roof of the main module such that the flotation module determines a roof contour of the vehicle;
    an aperture that is arranged in a region of the rear of the vehicle or in a region of the roof of the vehicle such that, during operation of the vehicle as a watercraft, a hatch of the main module can be opened within the aperture, and
    another hatch on the buoyancy body that can be opened within the aperture; and
    a land travel subassembly for operation of the vehicle as a land vehicle.

2. The flotation module as claimed in claim 1, wherein the roof contour of the buoyancy body determines a distance between the roof contour and a water line of the vehicle.

3. The flotation module as claimed in claim 1, further comprising an interface in a portion of the buoyancy body that extends over a roof of the vehicle main module, via which the land travel subassembly interacts with other vehicle components.

4. The flotation module as claimed in claim 1, further comprising a prow-like outer contour.

5. The flotation module as claimed in claim 1, wherein the land travel subassembly is selected from an ABC system, a cooling system, a battery system, a tank, a power-supply unit, a hydraulic pump, and a compressor.

6. A vehicle having a main module for accommodating crew members, the vehicle comprising:
    a buoyancy body that renders the vehicle buoyant, the buoyancy body having an inverted U shape in cross section that extends over lateral sides and a roof of the main module such that the flotation module determines a roof contour of the vehicle;

a land travel subassembly for operation of the vehicle as a land vehicle; and for operation of the vehicle as a watercraft, the buoyancy body is arranged on the main module such that the inverted U shape in cross section of the buoyancy body extends over lateral sides and a roof of the main module such that the flotation module determines a roof contour of the vehicle.

7. The vehicle as claimed in claim 6, wherein the flotation module encompasses the main module at a prow.

8. The vehicle as claimed in claim 6, wherein the flotation module includes a mount on a portion of the inverted U shape extending over the roof of the vehicle.

9. The vehicle as claimed in claim 6, wherein the flotation module has an aperture, which is arranged such that a hatch on the roof of the main module, during operation of the vehicle as a watercraft, can be opened within the aperture.

10. The vehicle as claimed in claim 6, further comprising a mission module for operation of the vehicle as a land vehicle, which is connected to the main module.

11. The vehicle as claimed in claim 6, further comprising crawler tracks, an engine located in the main module powering the crawler tracks, and a water drive, for driving the vehicle during water travel, wherein the water drive is arranged on the flotation module adjacent a lateral side of the main module above the crawler tracks.

12. The vehicle as claimed in claim 11, wherein the flotation module has a first interface and the main module has a second interface that is connected to the first interface, whereby the water drive is supplied with power from the engine.

13. The vehicle as claimed in claim 12, wherein the main module has a detection device, connected to the second interface, which can detect the module connected to the main module.

14. The vehicle as claimed in claim 12, wherein the first interface and the second interface form a plug-in connection.

15. The vehicle as claimed in claim 6, wherein the flotation module includes a land travel subassembly selected from a cooling system, an ABC system, a battery system, a tank, a power-supply unit, a hydraulic pump, and a compressor.

16. The vehicle as claimed in claim 15, wherein the land travel subassembly is powered by the engine through a first interface in the flotation module that forms a plug-in connection with a second interface in the main module.

17. The vehicle as claimed in claim 16, wherein the land travel subassembly includes a cooling system that cools the interior of the main module.

18. A flotation module for a vehicle, the vehicle having a main module to accommodate a crew and an engine that drives crawler tracks of the vehicle, the flotation module comprising:

a buoyancy body that renders the vehicle buoyant, the buoyancy body having an inverted U shape in cross section that extends over lateral sides and a roof of the main module such that the flotation module determines a roof contour of the vehicle;

an upper side of the flotation module having a mount, in which is accommodated a remote-control weapon; and a land travel subassembly for operation of the vehicle as a land vehicle.

* * * * *